United States Patent Office 3,338,344
Patented Aug. 29, 1967

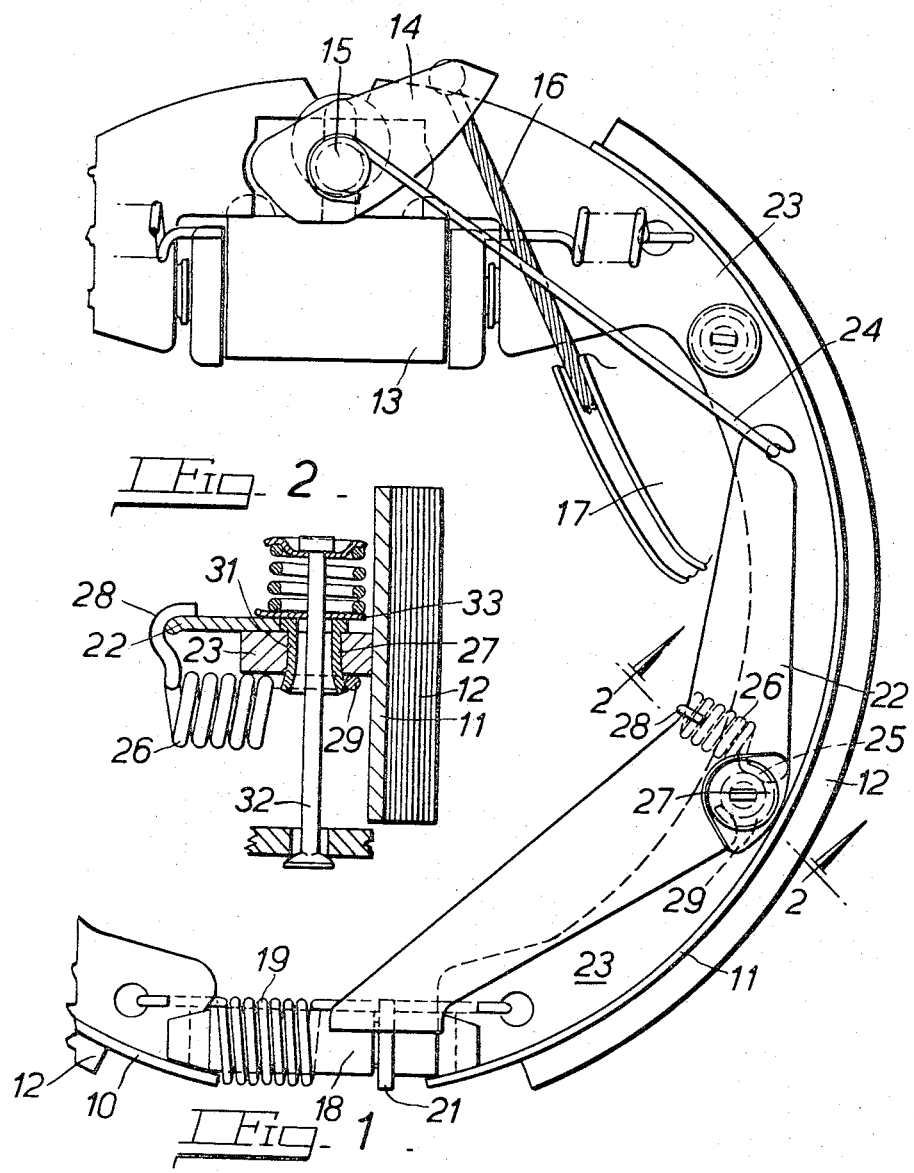

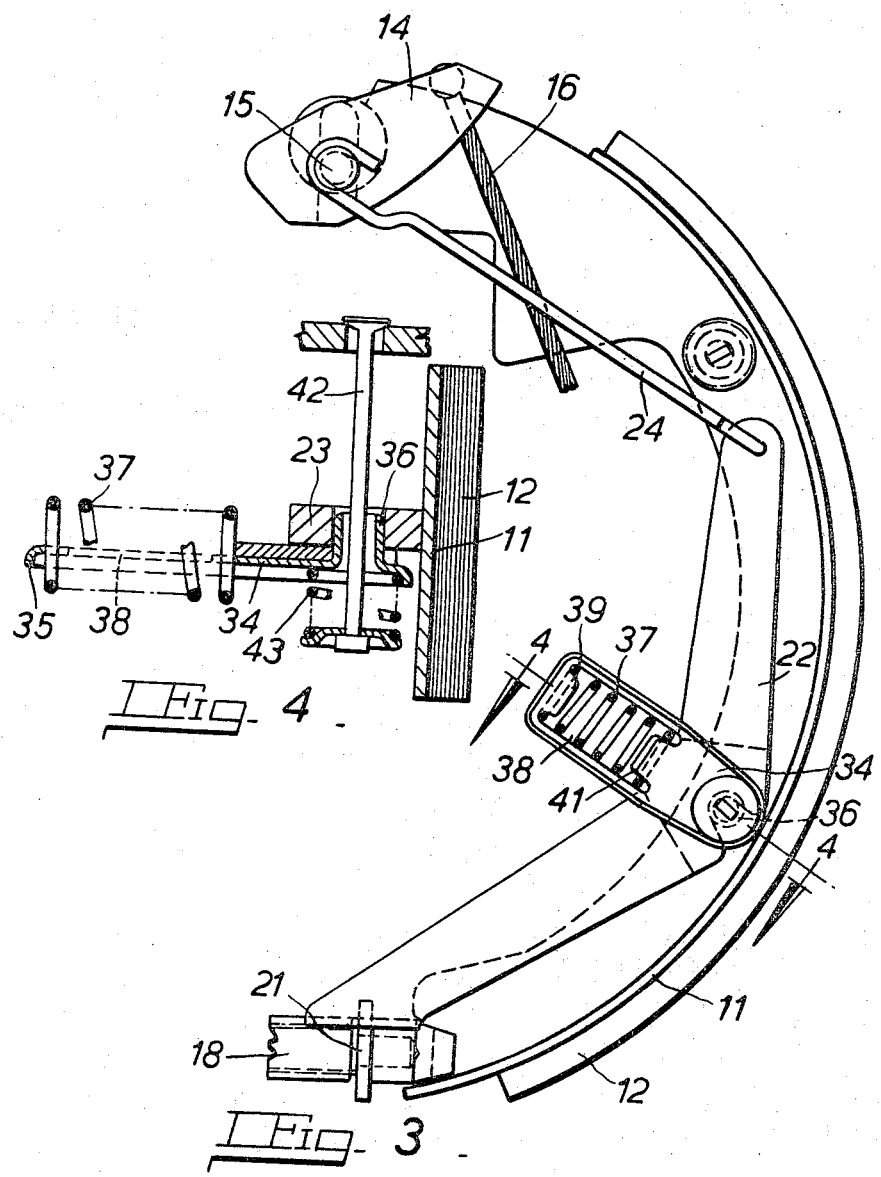

3,338,344
AUTOMATIC ADJUSTER FOR SHOE DRUM BRAKES
Albert Charles Hill, Acocks Green, Birmingham, England, assignor to Girling Limited, Birmingham, England, a British company
Filed Sept. 16, 1965, Ser. No. 487,736
Claims priority, application Great Britain, Sept. 16, 1964, 37,759/64
3 Claims. (Cl. 188—79.5)

ABSTRACT OF THE DISCLOSURE

In an automatic brake adjuster for a shoe drum brake of the type having a lever pivotally carried by one of the shoes and having one end anchored and the other end engageable with a screw threaded adjuster, the pivotal connection of the lever with the drum comprising a notch in the lever intermediate its ends and pin means carried by the shoe and engaged by the notch with spring means urging the notch into yielding engagement with the pin, an improved spring support which comprises a unitary pressing having a radially outer end which serves as a pin and a radially inner end which provides a guide for the spring whose opposite end is engaged by a radial projection carried by the lever.

*Detailed description*

This invention relates to improvements in automatic adjusters for shoe drum brakes of the kind in which a lever pivoted on a shoe is connected at one end to a fixed anchorage and at the other end co-operates with one member of a screw and nut or equivalent assembly of adjustable length whereby when the movement of the shoe in the application of the brake exceeds a predetermined value the lever is moved angularly to rotate the member and increase the effective length of the assembly.

A serious disadvantage of adjusters of that kind is that after the shoes are in engagement with the drum the frictional resistance offered by the screw-threads to relative rotation between the two members of the screw and nut assembly is such that the lever bends or the teeth or the like on the rotatable member with which the lever engages are broken.

To overcome this disadvantage various proposals have been made for permitting movement of the lever or a part of it relative to the shoe against resilient resistance to avoid overloading the lever.

According to my invention, in an automatic adjuster for shoe drum brakes of the kind set forth the lever is formed with an open-ended notch resiliently held in rocking engagement with a pivot pin or peg in the shoe web whereby when the resistance to movement of the lever exceeds a predetermined value the shoe can move outwardly independently of the lever in the application of the brake and no undue force can be applied to the lever by the shoe.

Two embodiments of our invention are illustrated by way of example in the accompanying drawings in which:

FIGURE 1 is an end elevation of the parts of a shoe drum brake with which the invention is concerned, FIGURE 2 is a fragmentary section on a larger scale on the line 2—2 of FIGURE 1, FIGURE 3 is an elevation similar to FIGURE 1 but showing modified means for loading the lever pivot, and FIGURE 4 is a fragmentary section on a larger scale on the line 4—4 of FIGURE 4.

The brake illustrated is of the duo-servo shoe drum type. Two opposed arcuate shoes 10, 11 carrying friction linings 12 are mounted on a stationary back-plate (not shown). The shoes are adapted to be separated at one end by a double-ended hydraulic cylinder 13 for service braking and by a cam 14 for parking or emergency braking. The cam is rotatably mounted on an anchor pin 15 for the shoes and is actuated by a cable 16 carried over a quadrant 17. The other ends of the shoes are connected by a strut 18 with which they are held in engagement by a spring 19. The strut 18 is adjustable in length to compensate for wear of the shoe linings, the adjustment being effected by rotation of a toothed wheel 21 on one part of the strut.

The adjustment is effected by angular movement of a lever 22 which lies against one side of the web 23 of the shoe 11. One end of the lever engages with the toothed wheel and is formed as or carries a pawl. The other end of the lever is coupled by a link 24 to the anchor pin 15.

At an intermediate point in the length of the lever a part-circular notch 25 is formed in its radially outermost edge and the notch is held by a spring 26 in engagement with the inner surface of a pivot pin 27 fixed in the web 23 of the shoe. The spring 26 is a tension spring of which one end 28 is hooked over the radially innermost edge of the lever and the other end 29 over the pin 27.

The pin 27, as shown in FIGURE 2, is a hollow tubular member, the notch 25 in the lever engaging with an enlarged head 31 on the pin on the opposite side of the shoe web from the spring anchorage. A spring-loaded hold-down device 32 of known type for holding the shoe against the stationary back-plate of the brake passes through the hollow pivot; a spring-loaded washer 33 on the device holds the lever in sliding engagement with the adjacent face of the shoe web.

In the modification shown in FIGURES 3 and 4 the tension spring 26 is replaced by a compression spring. A sheet metal pressing 34 having a peripheral stiffening flange 35 is formed at one end with a hollow cylindrical spigot 36 which is rotatably received in an opening in the shoe web 23. A part-circular notch in the radially outermost edge of the lever 22 is held in rocking engagement with the spigot 36 by a compression spring 37 located in a substantially radial opening 38 in the pressing and abutting between the radially inner end of the opening and the radially inner edge of the lever. The spring is located by projections 39, 41 on the pressing and lever respectively entering the ends of the spring.

A spring-loaded hold-down device 42 passes through the spigot 36, the spring 43 of the device serving also to hold the spigot 36 in the shoe and to locate the lever which lies between the pressing 34 and the shoe web.

Advantages of the methods of mounting and locating the lever as described above are that the lever can be mounted on a part of the shoe web of small radial width, the lever can be removed without disturbing the shoe hold-down spring, and the mounting allows the lever pivot to be loaded by a simple coil spring.

What is claimed is:

1. A self-adjusting assembly for the shoes of a shoe drum brake incorporating opposed arcuate shoes and screw-and-nut mechanism for separating said shoes to compensate for wear, one part of said mechanism being rotatable, comprising a lever extending in a substantially circumferential direction adjacent to the web of a shoe, means connecting one end of said lever to a fixed anchorage, a ratchet and pawl engagement between the other end of said lever and said rotatable part of the screw-and-nut mechanism, a metal pressing comprising a hollow spigot portion received in an opening in the shoe web and a flat portion extending radially inwardly from said spigot portion, an open-ended notch in the radially outermost edge of said lever at an intermediate point in its length engaging said spigot portion of the pressing, a radially elongated opening in said flat portion of the pressing, and a compression spring located in said opening and abutting between the radially outermost end of said opening and the radially innermost edge of said lever to hold said notch in the lever in rocking engagement with said spigot.

2. A self-adjusting assembly for the shoes of a shoe drum brake as in claim 1 wherein projections are formed pressing is formed with a peripheral stiffening flange.

3. A self-adjusting assembly for the shoes of a shoe drum brake as in claim 1 wherein projections are formed on the pressing and lever respectively for entering the ends of the spring to locate it.

References Cited
UNITED STATES PATENTS 3,114,439 12/1963 Bauman _____ 188—79.5
3,213,970 10/1965 Dombeck et al. _____ 188—79.5

DUANE A. REGER, *Primary Examiner.*